(12) United States Patent
Fenger (10) Patent No.: US 12,473,179 B2
(45) Date of Patent: Nov. 18, 2025

(54) BASE FOR SUPPORTING A PORTABLE CRANE AND A METHOD FOR REMOVING A MAIN BEARING OF A WIND TURBINE

(71) Applicant: LIFTRA IP APS, Aalborg SV (DK)

(72) Inventor: Per Eske Fenger, Terndrup (DK)

(73) Assignee: LIFTRA IP APS, Aalborg SV (DK)

( * ) Notice: Subject to any disclaimer, the term of this patent is extended or adjusted under 35 U.S.C. 154(b) by 203 days.

(21) Appl. No.: 18/558,242

(22) PCT Filed: May 3, 2022

(86) PCT No.: PCT/EP2022/061836
§ 371 (c)(1),
(2) Date: Oct. 31, 2023

(87) PCT Pub. No.: WO2022/233861
PCT Pub. Date: Nov. 10, 2022

(65) Prior Publication Data
US 2024/0367950 A1  Nov. 7, 2024

(30) Foreign Application Priority Data

May 3, 2021 (DK) ............................ PA 2021 70204

(51) Int. Cl.
*B66C 23/20* (2006.01)
*F03D 13/10* (2016.01)
*F03D 80/80* (2016.01)

(52) U.S. Cl.
CPC .......... *B66C 23/207* (2013.01); *F03D 13/122* (2023.08); *F03D 80/881* (2023.08); *F05B 2240/916* (2013.01)

(58) Field of Classification Search
CPC ... B66C 23/207; F03D 13/122; F03D 80/881; F03D 13/00; F03D 80/80; F05B 2240/916
See application file for complete search history.

(56) References Cited

U.S. PATENT DOCUMENTS

| 2010/0021278 A1* | 1/2010 | Stegemann ........... B66C 23/207 414/629 |
| 2012/0294720 A1 | 11/2012 | Smook |

(Continued)

FOREIGN PATENT DOCUMENTS

| EP | 1677006 A2 | 7/2006 |
| EP | 2147885 B1 | 2/2013 |

(Continued)

OTHER PUBLICATIONS

International Search Report and Written Opinion issued in related App. No. PCT/EP2022/061836, mailed Sep. 14, 2022.

(Continued)

*Primary Examiner* — Anna M Momper
*Assistant Examiner* — Juan J Campos, Jr.
(74) *Attorney, Agent, or Firm* — AVEK IP, LLC (57) ABSTRACT

A base for supporting a portable crane for handling components of a wind turbine is described. The base is mountable on the wind turbine, and configured to be switched between a first configuration and a second configuration. In the first configuration the base is configured for being supported by a main bearing of the wind turbine to allow the portable crane to lift a gearbox of the wind turbine. In the second configuration the base is configured for being supported by a bed plate of a nacelle of the wind turbine to allow the portable crane to lift the main bearing. The base is configured for supporting the portable crane while switching between the first configuration and the second configuration. A method for removing a main bearing of a wind turbine is also disclosed.

20 Claims, 7 Drawing Sheets

(56) References Cited

U.S. PATENT DOCUMENTS

| | | | |
|---|---|---|---|
| 2015/0086367 A1 | 3/2015 | Holloway et al. | |
| 2017/0306930 A1* | 10/2017 | Fenger | F03D 13/10 |
| 2018/0335023 A1 | 11/2018 | Trede | |
| 2019/0203700 A1* | 7/2019 | Numajiri | B66C 1/108 |
| 2020/0362824 A1* | 11/2020 | Kofman | F03D 1/125 |
| 2020/0378368 A1* | 12/2020 | Aitken | F03D 80/50 |

FOREIGN PATENT DOCUMENTS

| | | |
|---|---|---|
| EP | 3312415 A1 | 4/2018 |
| WO | 2011051272 A2 | 5/2011 |
| WO | 2015078475 A1 | 6/2015 |
| WO | 2016055065 A1 | 4/2016 |
| WO | 2019100146 A1 | 5/2019 |
| WO | 2020041867 A1 | 3/2020 |
| WO | 2021077207 A1 | 4/2021 |

OTHER PUBLICATIONS

Search Report dated Nov. 2, 2021, issued by Danish Patent and Trademark Office in priority App. No. PA 2021 70204.

\* cited by examiner

BASE FOR SUPPORTING A PORTABLE CRANE AND A METHOD FOR REMOVING A MAIN BEARING OF A WIND TURBINE

CROSS-REFERENCE TO RELATED APPLICATIONS

This application is the national phase of, and claims priority to, International Application No. PCT/EP2022/061836, filed May 3, 2022, which claims priority to Danish Application No. PA 2021 70204, filed May 3, 2021.

FIELD OF THE INVENTION

The invention relates to a base for supporting a portable crane for handling components of a wind turbine and to a method for removing a main bearing of a wind turbine.

BACKGROUND OF THE INVENTION

Wind power generated by wind turbines is one energy source which has gained traction as an environmentally friendly viable energy source. A wind turbine typically includes a tower, a nacelle arranged at the top of the tower, and a rotor including one or more rotor blades. The nacelle comprises a bed plate for supporting components of the wind turbine, such as a generator, a gearbox, and a main bearing.

The handling of wind turbine components in connection with assembly, maintenance, repairs, and disassembly can be a complicated task as they are often heavy and bulky. This problem is particularly pronounced when the handling of components is to be carried out in a nacelle high above ground or sea level.

Portable cranes are typically used for handling large components, such as gearboxes and main bearings, in the nacelles of wind turbines. The portable crane is hoisted up to the nacelle, for example by means of a smaller crane mounted permanently in the nacelle, and mounted onto the nacelle to allow the portable crane to handle components within the nacelle. As the structure of the wind turbine will often not allow a safe direct mounting of the portable crane, it is typically mounted onto a base configured for supporting the portable crane during handling of components. As limited space is available in the nacelle, the base is often mounted on one or more components of the wind turbine and this may result in limitations with respect to which components can be handled by the portable crane.

SUMMARY OF THE INVENTION

It is therefore an object of the invention to provide an improved base for supporting a portable crane for handling components of a wind turbine, which base provides a greater versatility when it comes to handling of components in the nacelle.

This is achieved with a base, which is mountable on the wind turbine and is configured to be switched between a first configuration and a second configuration, wherein in the first configuration the base is configured for being supported by a main bearing of the wind turbine to allow the crane to lift a gearbox of the wind turbine, wherein in the second configuration the base is configured for being supported by a bed plate of a nacelle of the wind turbine to allow the crane to lift the main bearing, and wherein the base is configured for supporting the crane while switching between the first configuration and the second configuration.

Consequently, the base is not limited to use in lifting either the gear box or the main bearing but may be used for both purposes. In addition to facilitating the handling of components inside the nacelle, the logistics associated with the base is also reduced as only a single base needs to be transported to the wind turbine even when needing to lift different components.

Furthermore, as the portable crane is also supported by the base while switching between the first configuration and the second configuration, the base may be switched between the first configuration and the second configuration without having to dismount and remove the portable crane from the base.

In this context, "handling components of the wind turbine" is to be understood as comprising any actions associated with maintenance of the wind turbine, replacement of parts of the wind turbine, installation of the wind turbine, or disassembly of the wind turbine, etc.

In this context, a reference to an item being supported by another is not limited to meaning that there must be a direct contact between them. On the contrary, unless otherwise stated, intermediate elements may be arranged between them. Similarly, references to items being connected to each other are intended to include indirect connections where the two items are connected via one or more intermediate elements.

In this context the wording "the base is configured to be switched between a first configuration and a second configuration" is to be interpreted as the base being designed for being arranged either in the first configuration or in the second configuration. The switching will be dependent on the requirements needed of the base, such as if the portable crane is to be used for lifting the main bearing, the gear box, or another component of the wind turbine. In the following, reference will be made to the base and the portable crane being for lifting either the main bearing or the gear box as these, but it is to be understood that the base is not limited to these uses.

Switching of the base between the first configuration and the second configuration may involve one or more manually or automatically performed steps. Switching of the base between the first configuration or the second configuration may involve using one or more tools.

The base is preferably mountable to the wind turbine by bolting, screwing or other releasable connections, but it is within the scope of the invention that the base is simply configured for resting directly or indirectly on the main bearing and/or the gear box under the influence of gravity.

Preferably, the base is configured to be mounted up tower of a wind turbine, i.e. the base being transported up to the nacelle of the wind turbine and then connected on a component of the window turbine, such as the bed plate of the nacelle or the main bearing. The base may be lifted up to the nacelle by means of an additional crane mounted to the nacelle of the wind turbine, where the additional crane is smaller than the portable crane.

The bed plate of the nacelle is preferably formed as a substantially rectangular plate when viewed from above. The bed plate extends longitudinally along a longitudinal direction, and extends transversally along a transversal direction, where the transversal direction is perpendicular to the longitudinal direction. The bed plate supports other components arranged in the nacelle, such as a generator, a gearbox, and a main bearing. The gear box and the main bearing are normally arranged sequential after each other along the longitudinal direction.

In the first configuration of the base, the base is configured for being supported by a main bearing of the wind turbine. The base may be directly connected to the main bearing or indirectly connected to the main bearing. For example, the base may be connected to a component of the wind turbine connected to the main bearing, thus achieving an indirect connection between the main bearing and the base. When the base is in the first configuration, the portable crane will thus be fully or partly supported by the main bearing. The connection between the base and the main bearing or one or more other components connected to the main bearing may be carried out by bolting, screwing or other releasable connections. In the first configuration, the portable crane can lift the gearbox of the wind turbine, i.e. the base does not support the portable crane via the gearbox.

In the second configuration of the base, the base is supported by a bed plate of the nacelle of the wind turbine. The base may be directly connected to the bed plate or indirectly connected to the bed plate. For example, the base may be connected to a component of the wind turbine connected to the bed plate, thus achieving an indirect connection between the bed plate and the base. When the base is in the second configuration, the portable crane is fully or partly supported via the bed plate. The connection between the base and the bed plate or other components connected to the bed plate may be carried out by bolting, screwing or other releasable connections. In the second configuration, the portable crane can lift the main bearing of the wind turbine, i.e. the base does not support the portable crane via the main bearing.

In an embodiment, the base further comprises one or more bearing adapters configured for being connected to the main bearing in the first configuration and for supporting the portable crane in the first configuration.

The bearing adapters may be directly connected to the main bearing, i.e. abutting or otherwise contacting the main bearing. Alternatively, the bearing adapters may be connected via one or more bearing shims. The one or more bearing shims allows for the height of the bearing adapters relative to the main bearing to be adjusted. Alternatively, the bearing adapters or bearing shims may be connected indirectly to the main bearing, e.g. connected to a component connected to the main bearing. The bearing adapters are preferably connected to the main bearing via bolts, screws or other releasable connections. The bearing adapters may be connected to a pillow block of the main bearing. When using two bearing adapters, they are preferably arranged on opposing sides of the main bearing, i.e. symmetric with each other about the longitudinal direction defined by the bed plate. In some embodiments the bearing adapter(s) are only configured for supporting the portable crane in the first configuration.

In an embodiment the base further comprises one or more side structures configured for being connected to the bed plate of the nacelle in the second configuration of the base, and for supporting the portable crane in the second configuration of the base.

The side structure(s) may be directly connected to the bed plate of the nacelle, i.e. abutting or otherwise contacting the bed plate. Alternatively, the side structures may be connected via one or more side shims. The one or more side shims allows for the height of the side structures relative to the bed plate to be adjusted. Alternatively, the side structures may be connected in-directly to the bed plate, e.g. connected to a component connected to the bed plate. The side structures are preferably connected to the bed plate via bolts, screws or other releasable connections. In some embodiments, the side structures are connected to the bed plate by resting on the bed plate without being fixedly connected to the bed plate. Where the portable crane is to lift a component, e.g. the main bearing, along the longitudinal direction, it may be enough to only have the side structures supporting the crane by resting on the bed plate of the nacelle. The side structures may further or alternatively be connected to a pillow block of the gear box of the wind turbine. In some embodiments the side structures are only configured for supporting the portable crane in the second configuration. When using two side structures they are preferably arranged on opposing sides of the main bearing, i.e. symmetric with each other about the longitudinal direction defined by the longitudinal extension of the bed plate.

In an embodiment the base further comprises one or more longitudinal beams configured for supporting the portable crane, wherein each longitudinal beam is connectable to a bearing adapter and a side structure, wherein in the first configuration the bearing adapter(s) are connected to the two longitudinal beams, and wherein the base is configured to be switched from the first configuration to the second configuration by connecting the side structure(s) to the longitudinal beam(s) and the bed plate of the nacelle and disconnecting the bearing adapter(s) from the main bearing.

Consequently, a simple structure is achieved for switching the base between the first configuration and the second configuration. Furthermore, the process described is easily reversible, i.e. going from the second configuration to the first configuration, by connecting the bearing adapter(s) to the main bearing and disconnecting the side structure(s) from the bed plate and/or the longitudinal beam(s). Furthermore, the above-described structure allows for the base to support the portable crane while going from the first configuration to the second configuration and vice versa.

It is presently considered advantageous that the base comprises two longitudinal beams each connectable to a bearing adapter and a side structure and being arranged on opposite sides of the main bearing in use.

The longitudinal beams are preferably connected to the side structures and the bearing adapters via bolts, screws or other releasable connections. The longitudinal beams may be directly connectable to the side structures and the bearing adapters, i.e. that is abutting or otherwise contacting each other. Alternatively, the longitudinal beams may be connectable to the side structures and the bearing adapters via one or more beam shims.

In this context, "disconnecting" is to be understood as removing a connection. For example, when writing the side structures are disconnected from the bed plate and/or the two longitudinal beams it may be interpreted as the bolts or screws connecting these are removed, thus disconnecting the side structures from the bed plate and/or the two longitudinal beams. Furthermore, disconnecting may refer to both removing a direct connection or an in-direct connection.

In an embodiment the two bearing adapters are configured to be disconnected from the two longitudinal beams, raised vertically and then reconnected to the two longitudinal beams, when switching the base from the first configuration to the second configuration. Consequently, by raising the bearing adapters an additional clearance for lifting the main bearing is provided. The bearing adapters may be raised manually. Alternatively, the bearing adapters may be raised by the usage of a jack or similar. The bearing adapters may be reconnected by bolts, screws or other releasable connections.

In an embodiment the base further comprises a rotor lock support configured for being connected to the bed plate of the nacelle via at least part of a rotor lock of the nacelle in the second configuration of the base and for supporting the portable crane in the second configuration of the base.

The rotor lock support may be directly connected to a rotor lock of the wind turbine, i.e. abutting, or otherwise contacting the rotor lock. The rotor lock support is preferably arranged at a longitudinal end of the bed plate and extending transversely to the longitudinal direction of the bed plate. In some embodiments, the rotor lock support is connected to the rotor lock by resting on the rotor lock without being fixedly connected to the rotor lock. In some embodiments the rotor lock support is only configured for supporting the portable crane in the second configuration. In an embodiment the rotor lock support comprises a through-going hole configured for receiving the at least part of the rotor lock.

Consequently, a simple and easy connection is achieved. Most wind turbines are provided with a rotor lock comprising a pin, thus the addition of a through-going hole configured for receiving such a pin allows for the rotor lock support to be engaged with the rotor lock, without the need for additional tools or equipment.

In an embodiment the rotor lock support is formed with an opening configured to allow the main bearing to pass through the rotor lock support in the second configuration of the base.

Consequently, the rotor lock support may only need to support against normal stresses, without having to support against shear stresses. Preferably, the opening is configured to allow a main bearing to be moved along a longitudinal direction of the nacelle to pass through the opening. Preferably, the opening extends in a plane perpendicular to the longitudinal direction.

In an embodiment the base further comprises a transversal beam configured for supporting the portable crane, wherein the transversal beam is connectable to two bearing adapters and the rotor lock support, wherein in the first configuration of the base the two bearing adapters are connected to the transversal beam, and wherein the base is switchable from the first configuration to the second configuration by connecting the rotor lock support to the transversal beam and disconnecting the bearing adapters from the main bearing.

Consequently, a simple structure is achieved for switching the base between the first configuration and the second configuration. Furthermore, the process described is easily reversible, i.e. going from the second configuration to the first configuration, by connecting the bearing adapters to the main bearing and disconnecting the rotor lock support from the rotor lock and the transversal beam. Furthermore, the structure allows for the base to support the portable crane while going from the first configuration to the second configuration and vice versa. The transversal beam is preferably connected to the rotor lock support and the bearing adapters via bolts, screws or other releasable connections. The transversal beam may be directly connectable to the rotor lock support and the bearing adapters, i.e. that is abutting or otherwise contacting each other. Alternatively, the transversal beam may be connectable to the rotor lock support and the bearing adapters via one or more beam shims.

According to a second aspect of the invention the object is achieved with a crane system for handling components of a wind turbine comprising a base according to the first aspect of the invention and a portable crane.

According to a third aspect of the invention the object is achieved with a method for removing a main bearing of a wind turbine comprising the steps of:

providing a base mountable on the wind turbine, wherein the base is configured to be switched between a first configuration and a second configuration, wherein in the first configuration the base is configured for being supported by a main bearing of the wind turbine, wherein in the second configuration the base is configured for being supported by a bed plate of a nacelle of the wind turbine, and wherein the base is configured for supporting a portable crane while switching between the first configuration and the second configuration, providing the portable crane mountable on the base, mounting the base to the nacelle of the wind turbine, mounting the portable crane to the base, if the base is in the first configuration, switching the base from the first configuration to the second configuration, and lifting the main bearing using the portable crane.

Other presently preferred embodiments and further advantages will be apparent from the subsequent detailed description and drawings.

Unless otherwise stated, a feature described in relation to one of the aspects of the invention may also be incorporated in the other aspects, and the advantage of the feature is applicable to all aspects in which it is incorporated.

BRIEF DESCRIPTION OF THE DRAWINGS

In the following description embodiments of the invention will be described with reference to the schematic drawings, in which.

DETAILED DESCRIPTION

In the following detailed description, preferred embodiments of the invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations.

It is noted that terms such as "up", "down", "left-hand", "right-hand", "exterior", "interior", "outer", "inner" are relative and refers to the viewpoint in question.

Figure 1:
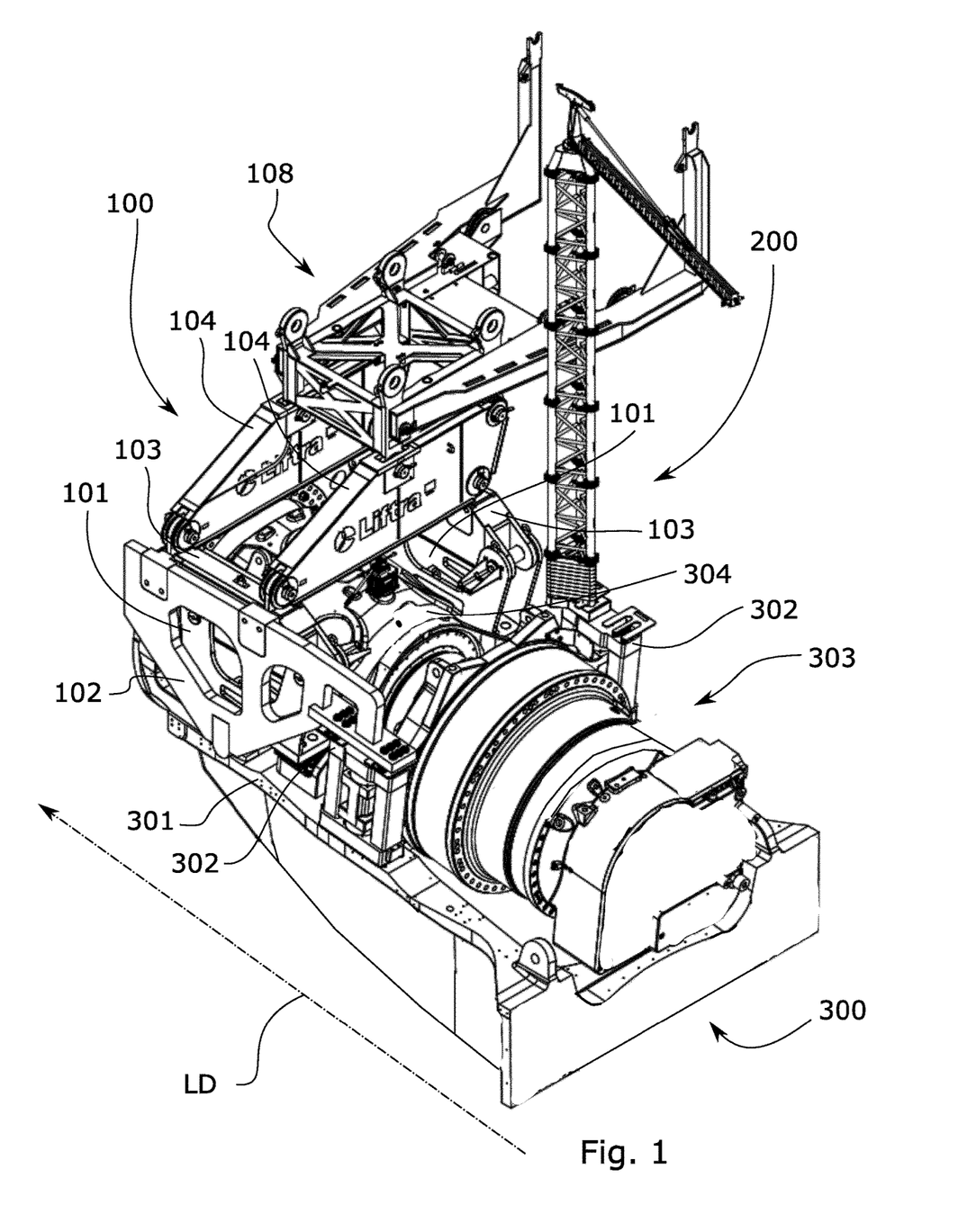
FIG. 1 is a schematic perspective view of a base mounted on the bed plate of a nacelle according to a first embodiment of the invention.

Referring initially to FIG. 1, which shows a schematic perspective view of a base 100 mounted on the bed plate 301 of a nacelle 300 according to a first embodiment of the invention. The nacelle 300 has been simplified and parts have been left out to ease understanding of the invention. The nacelle 300 is shown with the bed plate 301, a gear box 303, gear box pillow blocks and a main bearing 304. The bed plate 301 of the nacelle extends longitudinally in a longitudinal direction LD.

The base 100 is configured for supporting a portable crane (not shown) for handling components of a wind turbine, and in the shown embodiment, the base 100 is in a second configuration and is supported by the bed plate 301 of the nacelle 300. The base 100 is further supported by a gear box pillow block 302. In the second configuration, the base 100 is not supported by the main bearing 304, thus allowing a portable crane mounted on the base 100 to lift the main bearing 304.

The base 100 comprises two bearing adapters 101 arranged symmetrically around the main bearing 304, which will be explained in greater detail with reference to FIG. 3. The base 100 further comprises two side structures 102 arranged symmetrically around the main bearing 304, which will be explained in greater detail with reference to FIG. 2. The base 100 further comprises two longitudinal beams 103, each of which are each connectable to one of the two bearing adapters 101 and one of the two side structures 102. In the first configuration of the base the two bearing adapters 101 are connected to the two longitudinal beams 103. In the second configuration of the base the two side structures 102 are connected to the two longitudinal beams 103. The two longitudinal beams 103 extend longitudinally in parallel with the longitudinal direction LD and are arranged symmetrically around the main bearing 304.

Arranged on the two longitudinal beams 103 are two transversal beams 104. The two transversal beams 104 extend perpendicularly to the two longitudinal beams 103 and are at opposing ends connected to the longitudinal beams 103. Arranged on the transversal beams 104 is a crane receiving section 108. The crane receiving section 108 is configured for receiving a portable crane, to allow the portable crane to be connected to and supported by the base 100. Alternatively, the portable crane may be directly connected to the transversal and/or the longitudinal beams 104, 103.

In this embodiment, an additional crane 200 is mounted on a gear box pillow blow 302. The additional crane 200 may assist in raising parts of or the entire base 100 up to the nacelle 300. The additional crane 200 may also assist in raising the portable crane to be mounted on the base 100, and in installing the portable crane onto the base 100. In embodiments, where the base 100 is required to rest on both gear box pillow blocks 302 in the second configuration it may be necessary to disassemble and remove the additional crane 200.

Figure 2:
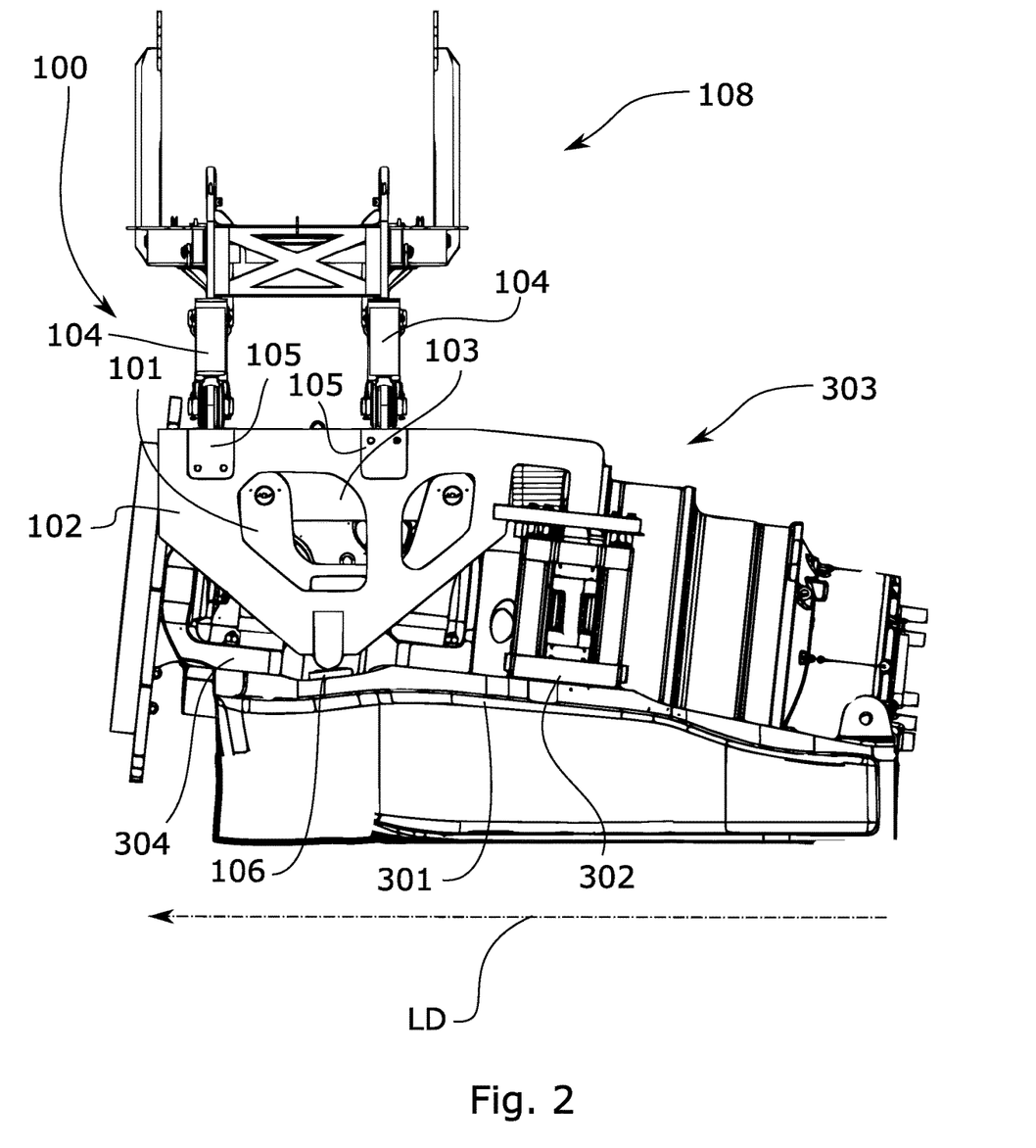
FIG. 2 is a schematic side view of a base mounted on the bed plate of a nacelle according to the first embodiment of the invention.

Referring to FIG. 2, which shows a schematic side view of a base 100 mounted on the bed plate 301 of a nacelle 300 according to the first embodiment of the invention.

In FIG. 2 the base 100 is shown in the second configuration. In the second configuration of the base 100, the side structure 102 is configured to support a portable crane received on the crane receiving section 108. The side structure 102 is seen extending longitudinally in parallel to the longitudinal direction LD. The side structure 102 is connected to the bed plate 301 via a side shim 106 and a similar shim may be found at the side structure on the opposite side of the main bearing 304. The side shim 106 is directly contacting the bed plate 301 and the side structure 102. The side structure 102 in the shown embodiment rests on the side shim 106 by gravitational force. Alternatively, the side structure 102 may be bolted to the bed plate 301 through the side shim, or directly resting on the bed plate 301. The side structure 102 is further connected to the gear box pillow block 302. Consequently, the base 100 is supported by the bed plate 301 and the gear box pillow block 302 via the side structure 102. By having the base 100 supported by the bed plate 301 and the gearbox pillow block 302 it allows a portable crane received by the crane receiving section 108 to lift the main bearing 304.

In this embodiment the side structure 102 is connected to the longitudinal beam 103 via two mounting brackets 105 and to the longitudinal beam 103 via bolts. The side structure 102 is connected to the longitudinal beam 103 so that it overlies the bearing adapter 101.

Figure 3:
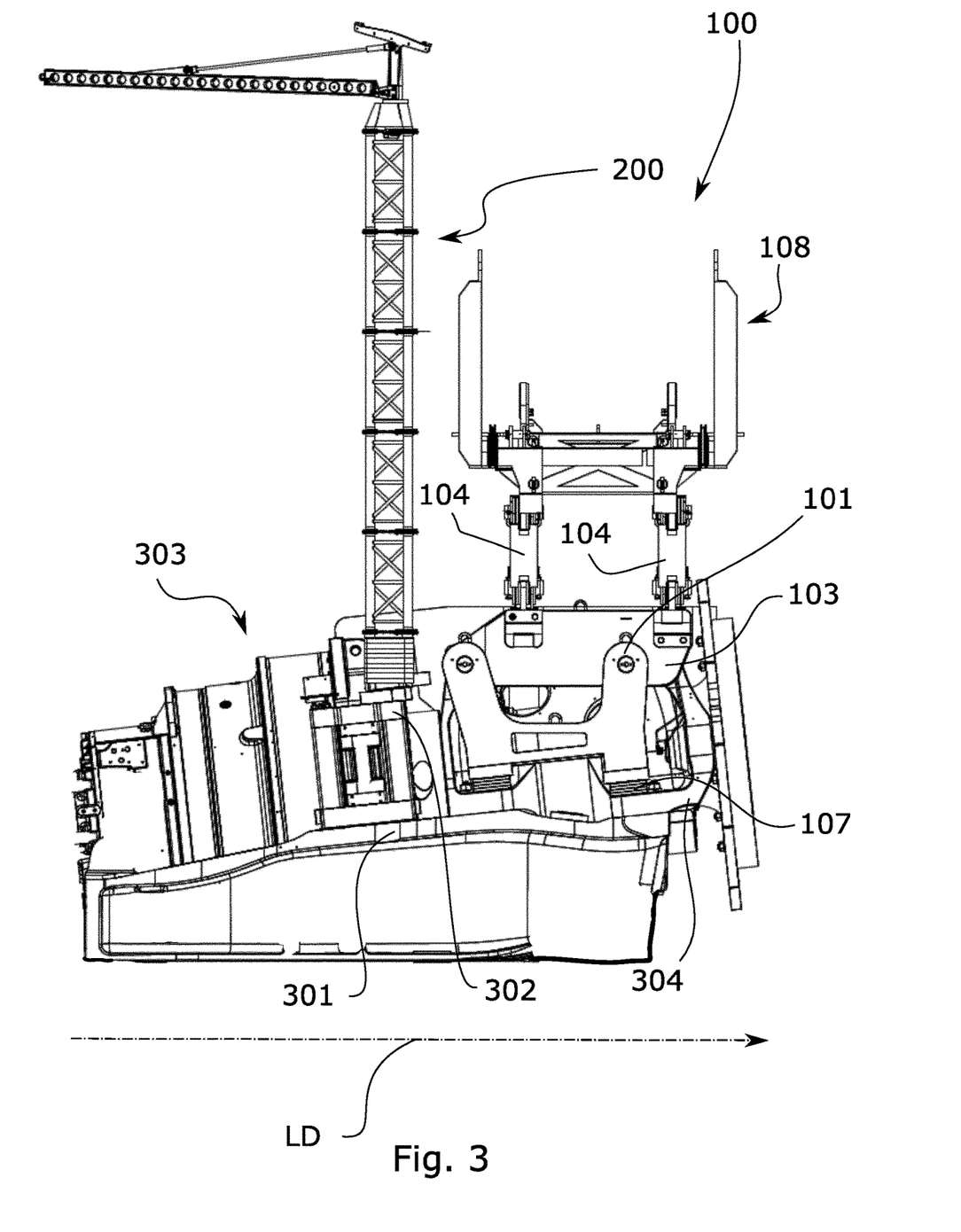
FIG. 3 is a schematic side view of a base mounted on the main bearing of a nacelle according to the first embodiment of the invention.

Reference is now made to FIG. 3, which shows a schematic side view of a base 100 mounted on the main bearing 304 of a nacelle 300 according to the first embodiment of the invention.

The base 100 is here in the first configuration. The bearing adapter 101 is seen extending longitudinally in parallel to the longitudinal direction LD. Although not shown, another bearing adapter 101 is arranged symmetric to the shown side adapter 102 on the opposite side of the main bearing 304. The bearing adapter 101 is connected to the main bearing 304 via a side shim 106. Specifically, the bearing adapter 101 is connected to a pillow block associated with the main bearing 304. The bearing adapter 101 is connected to the main bearing via a plurality of bearing shims 107. The bearing shims 107 are directly contacting the main bearing 304 and the bearing adapter 101. The connection between the bearing adapter 101 and the main bearing 304 allows for the bearing adapter 101 to support a portable crane received by the crane receiving section 108. Furthermore, as the base 100 is not supported by the gear box 303 it allows a portable crane received by the crane receiving section to lift the gear box 303.

In this embodiment, the bearing adapter 101 is formed with a substantially H-shape. The two feet of the H-shape is connected to the main bearing 304 at two different positions. The tops of the H-shape are connected to the longitudinal beam 103 via bolts. The bearing adapter 101 may be connectable to the longitudinal beam 103 at two different positions. A first position, as shown, associated with the base 100 being in the first configuration, and a second position, associated with the base 100 being in the second configuration. The bearing adapter 100 when connected to the longitudinal beam 103 in the second position is raised when compared to the first position. The longitudinal beam 103 may for example be provided with a first set of bolt holes for connecting the bearing adapter 101 to the longitudinal beam in the first position, and a second set of bolt holes for connecting the bearing adapter 101 to the longitudinal beam in the second position.

The bearing adapter 101 in FIG. 3 is not connected to the gear box pillow block 302, thus allowing for other structures to be connected to the gear box pillow block 302. In the shown embodiment, the additional crane 200 is connected to the gear box pillow block 302.

Referring now to both FIGS. 2 and 3. When switching the base from the first configuration shown in FIG. 3 to the second configuration shown in FIG. 2, the two side structures 102 are connected to the longitudinal beams 103 and the bed plate 301 of the nacelle 300. Then the two bearing adapters 101 are disconnected from the main bearing 304. During the process a portable crane received by the crane receiving section 108 is supported by the base 100. Furthermore, bearing adapters 101 may be disconnected from the longitudinal beams 103 and raised, and then reconnected to the longitudinal beams 103 to provide clearance for lifting the main bearing 304. Alternatively, if the bearing adapters 101 are resting on bearing shims 107, it may be sufficient to remove these to provide clearance for lifting the main bearing 304.

Figure 4:
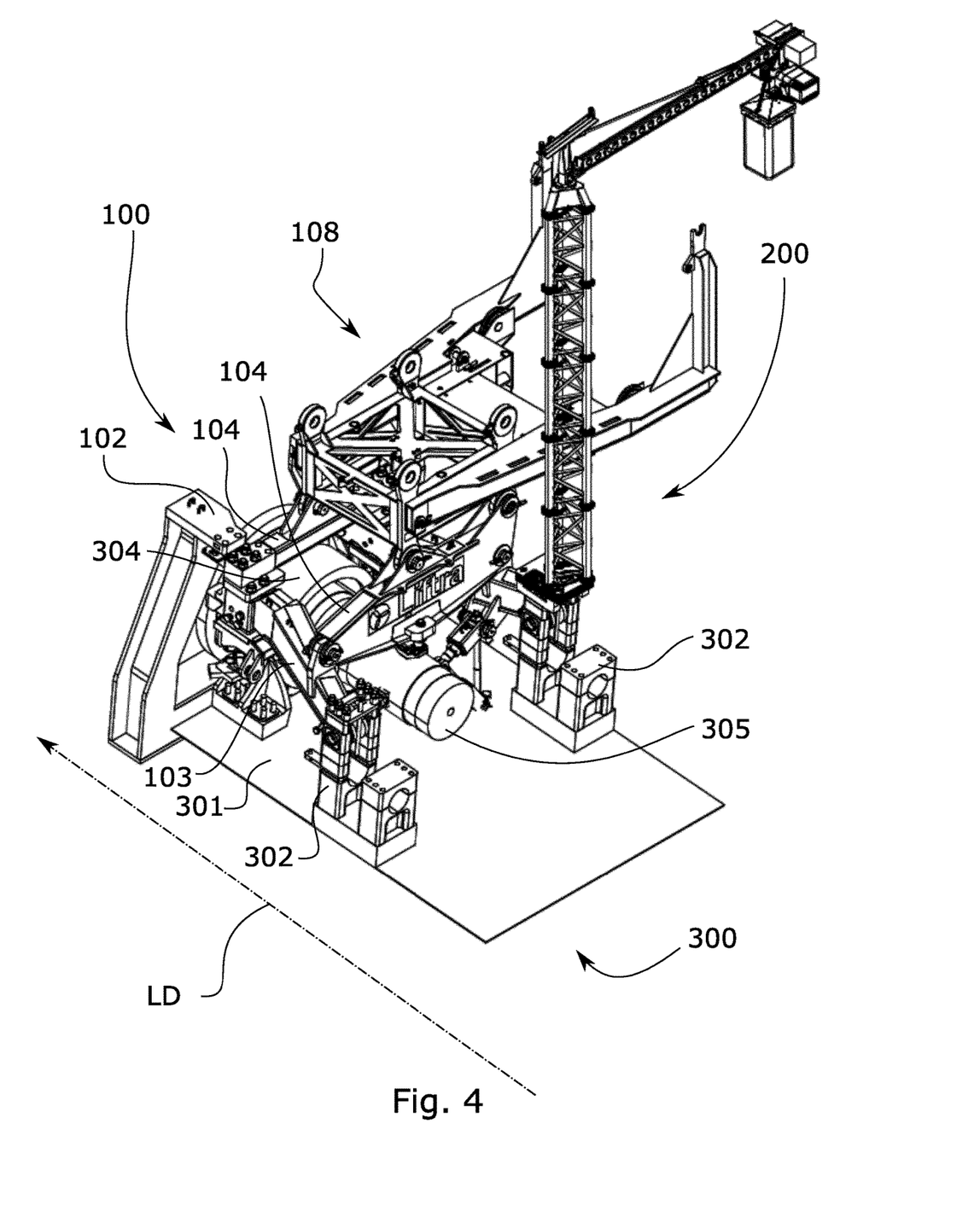
FIG. 4 is a schematic perspective view of a base mounted on the bed plate of a nacelle according to a second embodiment of the invention.

Referring to FIG. 4, which shows a schematic perspective view of a base 100 mounted on the bed plate 301 of a nacelle 300 according to a second embodiment of the invention.

In the shown embodiment, the base 100 is in a second configuration and is supported by the bed plate 301 of the nacelle 300. The base 100 is further supported by a gear box pillow block 302. In the second configuration the base is not supported by the main bearing 304, thus allowing a portable crane mounted on the base 100 to lift the main bearing 304.

The nacelle 300 in the shown embodiment has been simplified and parts have been left out to ease understanding of the invention. The nacelle 300 is shown with the bed plate 301, gear box pillow block 302, a main shaft 305, and the main bearing 304. The bed plate 301 of the nacelle extends longitudinally in a longitudinal direction LD.

The base 100 in the shown embodiment differs from the first embodiment in that the two longitudinal beams 103 are connected to the gear box pillow block 302 and the two transversal beams 104, when the base 100 is in the second configuration. When the base 100 is in the first configuration, two bearing adapters 101 are introduced and connected to the two longitudinal beams 103 and the main bearing 304.

Figure 5:
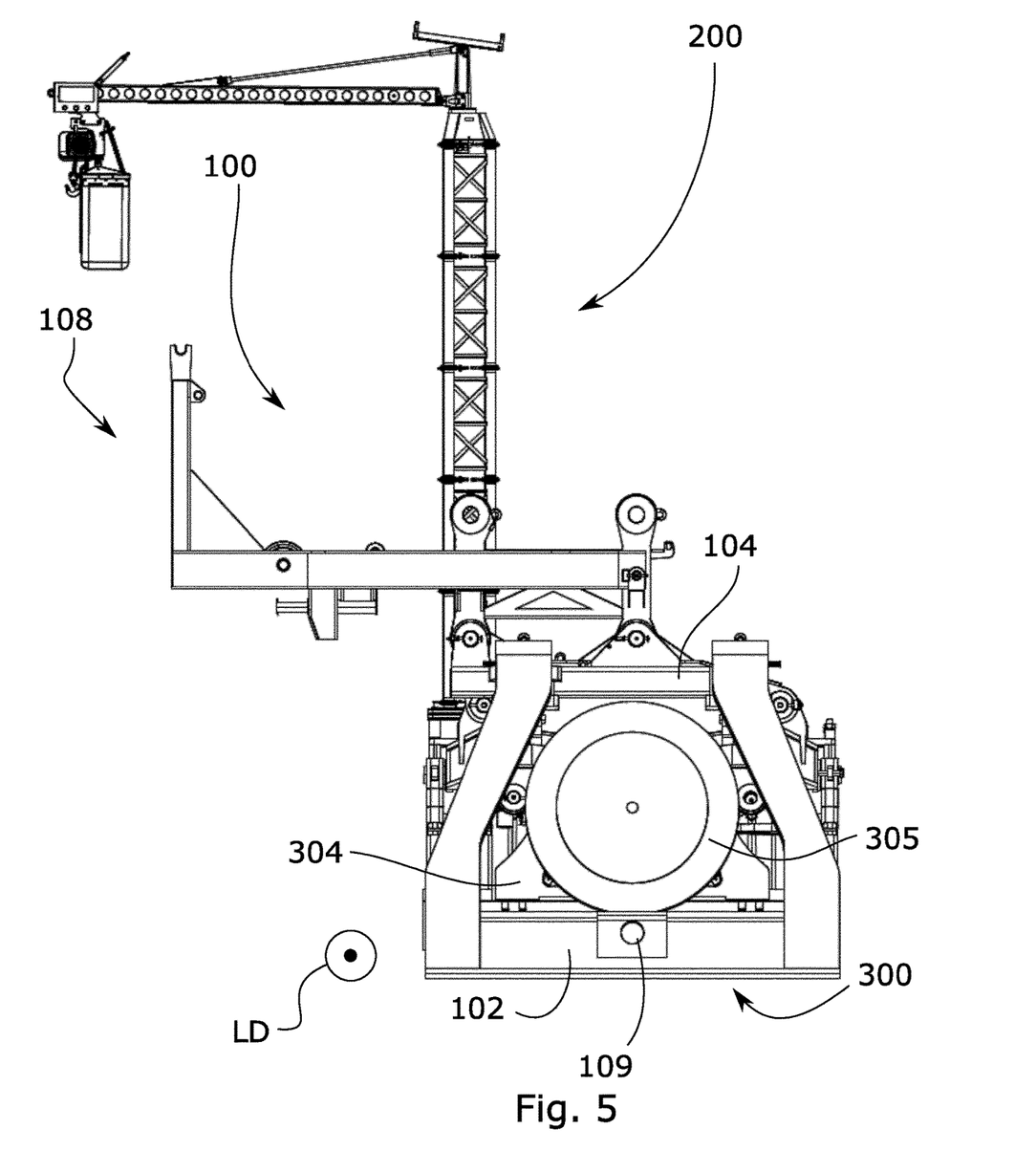
FIG. 5 is a schematic front view of a base mounted on the bed plate of a nacelle according to the second embodiment of the invention.

Referring now to FIG. 5, a schematic front view of a base 100 mounted on the bed plate of a nacelle 300 according to the second embodiment of the invention is illustrated.

In this embodiment a rotor lock support 102 serves substantially the same purpose as the side structures described above and have therefor been given the same reference number.

The rotor lock support is formed with a substantial U-shape, which defines an opening. The opening is configured to allow the main bearing 304 to pass through the rotor lock support 102, when the base 100 is in the second configuration. The opening allows a portable crane received on the crane receiving section 108 to lift the main bearing 304 through the opening along the longitudinal direction LD. A yoke (not shown) may be provided to facilitate lifting of the main bearing 304.

The rotor lock support 102 shown further comprises a through-going hole 109. The through going hole 109 is configured for receiving the rotor lock, shown in FIG. 6.

Figure 6:
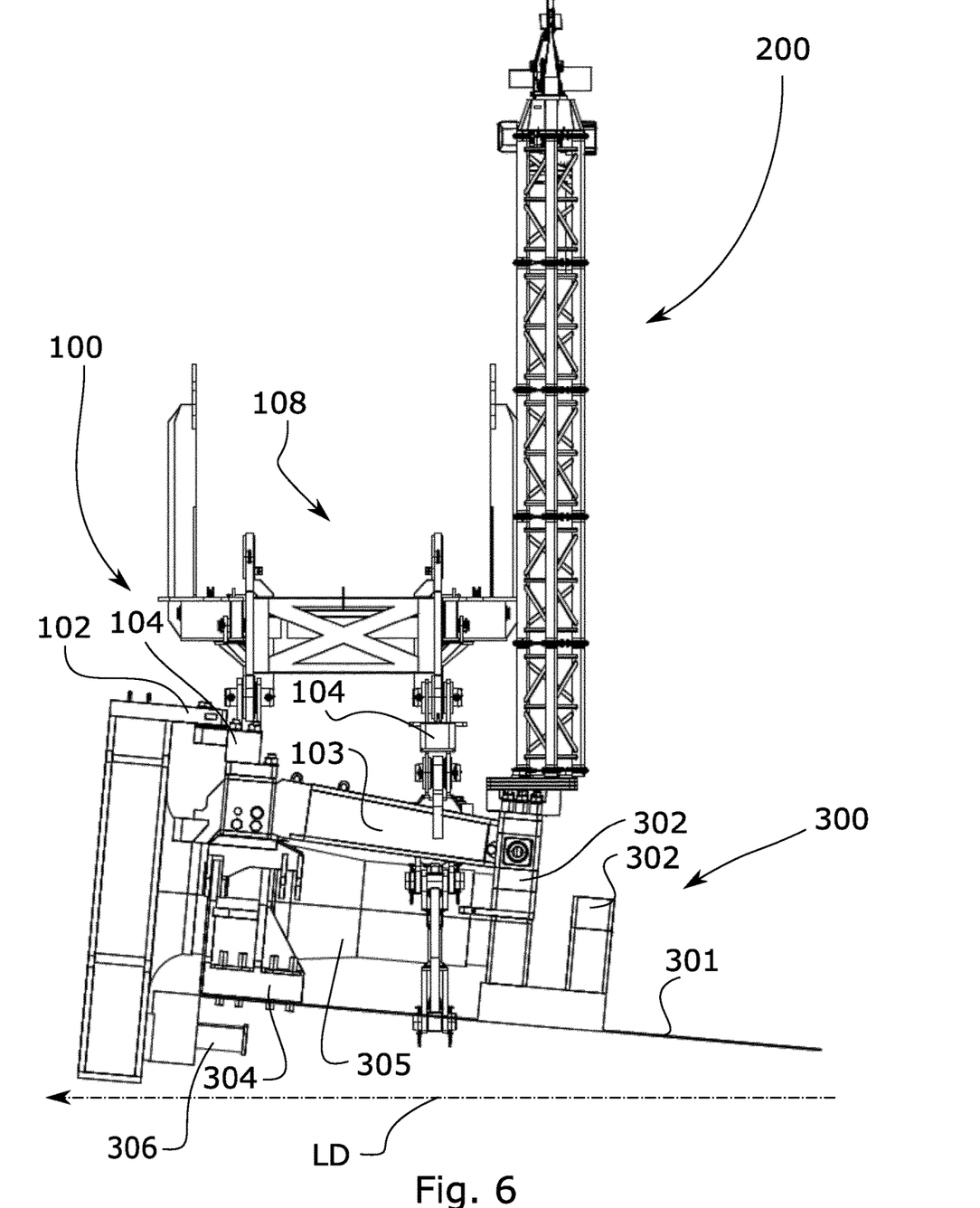
FIG. 6 is a schematic side view of a base mounted on the bed plate of a nacelle according to a second embodiment of the invention.

FIG. 6 shows a schematic side view of a base 100 mounted on the bed plate 301 of a nacelle 300 according to the second embodiment of the invention.

The base 100 is in the shown embodiment in the second configuration. The rotor lock support 102 is connected to a rotor lock 306. The rotor lock 306 comprises a pin, which is introduced into the through-going hole 109 of the rotor lock support 102, thus connecting the two parts.

The rotor lock support 102 is further connected to one of the transversal beams 104. Consequently, in the second configuration of the base 100, the base 100 is supported by the connection between the rotor lock support 102 and the rotor lock 306, and the connection between the longitudinal beams 103 and the gear box pillow block 302, thus allowing for a portable crane received by the crane receiving section 108 to lift the main bearing 304.

In this embodiment, the rotor lock support 102 is formed with a flange which is bolted together with the transversal beam 104.

One or more rotor lock shims may be arranged in-between the transversal beam 104 and the rotor lock support 102. The one or more rotor locks shims may facilitate alignment of the through-going hole 109 with the rotor lock 306.

The base 100 in the second embodiment may be changed from the second configuration to the first configuration by connecting bearing adapters to the main bearing 304, and disconnecting rotor lock support 102 from the transversal beam 104.

Figure 7:
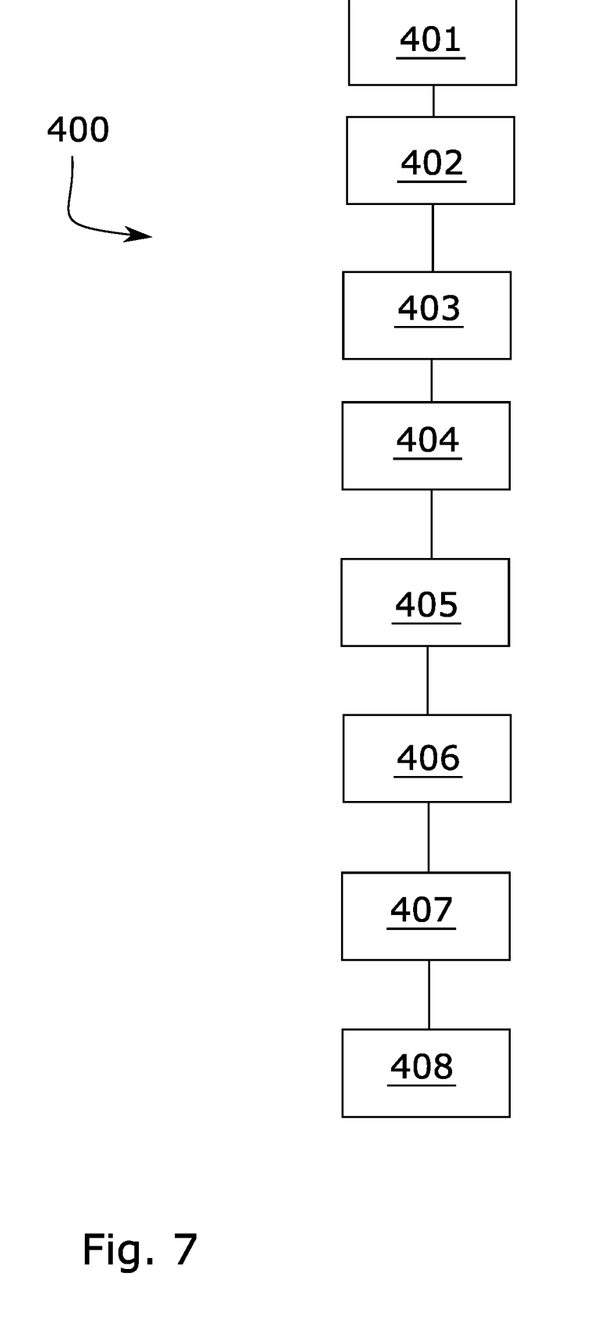
FIG. 7 is a flow chart depicting a method for removing a main bearing of a wind turbine.

FIG. 7 shows a flow chart of a method for removing a main bearing of a wind turbine according to an embodiment of the invention.

In a first step 401, a base is provided. The base is mountable on a nacelle of the wind turbine. As described above, the base is configured to be switched between a first configuration and a second configuration, where in the first configuration the base is connected to a main bearing of the wind turbine, and in the second configuration the base is connected to a bed plate of the nacelle, and the base is configured for supporting a portable crane while switching between the first configuration and the second configuration.

In a second step 402, a portable crane mountable on the base is provided.

In a third step 403, the base is mounted in the nacelle of the wind turbine.

In a fourth step 404, the portable crane is mounted to the base.

In a fifth step 405, the base is switched from the first configuration to the second configuration, if the base is initially in the first configuration.

In a sixth step 406, the main bearing is lifted using the portable crane. Lifting of the main bearing may comprise exchanging the main bearing, performing maintenance work on the main bearing, or the like.

The method may further comprise a seventh step 407 and an eighth step 408. In the seventh step 407, the base is switched from the second configuration to the first configuration. In the eighth step 408, the gear box is lifted using the portable crane. Lifting of the gear box may comprise exchanging the gear box, performing maintenance work on the gear box or the like.

The person skilled in the art realizes that the present invention by no means is limited to the preferred embodiments described above. On the contrary, many modifications and variations are possible within the scope of the appended claims.

The invention claimed is:

1. A base for supporting a portable crane for handling components of a wind turbine, wherein:
    the base is mountable on the wind turbine,
    the base is configured to be switched between a first configuration and a second configuration,
    in the first configuration the base is configured for being supported by a main bearing of the wind turbine to allow the portable crane to lift a gearbox of the wind turbine,
    in the second configuration the base is configured for being supported by a bed plate of a nacelle of the wind turbine to allow the portable crane to lift the main bearing, and
    the base is configured for supporting the portable crane while switching between the first configuration and the second configuration.

2. The base according to claim 1, wherein the base further comprises two bearing adapters configured for being supported by the main bearing in the first configuration and for supporting the portable crane in the first configuration.

3. The base according to claim 2, wherein the base further comprises two side structures configured for being supported by the bed plate of the nacelle in the second configuration of the base and for supporting the portable crane in the second configuration of the base.

4. The base according to claim 3, wherein the two side structures are configured for being directly connected to the bed plate of the nacelle in the second configuration of the base.

5. The base according to claim 4, wherein:
the base further comprises two longitudinal beams configured for supporting the portable crane,
each of the two longitudinal beams are connectable to one of the two bearing adapters and one of the two side structures,
in the first configuration the two bearing adapters are connected to the two longitudinal beam, and
the base is configured to be switched from the first configuration to the second configuration by connecting the two side structures to the two longitudinal beams and the bed plate of the nacelle and disconnecting the two bearing adapters from the main bearing.

6. The base according to claim 5, wherein:
the base further comprises a transversal beam configured for supporting the portable crane,
the transversal beam is connectable to the two bearing adapters and the rotor lock support,
in the first configuration of the base the two bearing adapters are connected to the transversal beam, and
the base is switchable from the first configuration to the second configuration by connecting the rotor lock support to the transversal beam and disconnecting the bearing adapters from the main bearing.

7. The base according to claim 3, wherein:
the base further comprises two longitudinal beams configured for supporting the portable crane,
each of the two longitudinal beams are connectable to one of the two bearing adapters and one of the two side structures,
in the first configuration the two bearing adapters are connected to the two longitudinal beam, and
the base is configured to be switched from the first configuration to the second configuration by connecting the two side structures to the two longitudinal beams and the bed plate of the nacelle and disconnecting the two bearing adapters from the main bearing.

8. The base according to claim 7, wherein the two bearing adapters are configured to be disconnected from the two longitudinal beams and raised vertically and reconnected to the two longitudinal beams when switching the base from the first configuration to the second configuration.

9. The base according to claim 2, wherein the base further comprises a rotor lock support configured for being connected to the bed plate of the nacelle via at least part of a rotor lock of the nacelle in the second configuration of the base and for supporting the portable crane in the second configuration of the base.

10. The base according to claim 9, wherein the rotor lock support comprises an opening configured to allow the main bearing to pass through the rotor lock support in the second configuration of the base.

11. The base according to claim 10, wherein:
the base further comprises a transversal beam configured for supporting the portable crane,
the transversal beam is connectable to the two bearing adapters and the rotor lock support,
in the first configuration of the base the two bearing adapters are connected to the transversal beam, and
the base is switchable from the first configuration to the second configuration by connecting the rotor lock support to the transversal beam and disconnecting the bearing adapters from the main bearing.

12. The base according to claim 1, wherein the base further comprises a rotor lock support configured for being connected to the bed plate of the nacelle via at least part of a rotor lock of the nacelle in the second configuration of the base and for supporting the portable crane in the second configuration of the base.

13. The base according to claim 12, wherein the rotor lock support comprises a through-going hole configured for receiving the least part of the rotor lock.

14. The base according to claim 13, wherein the rotor lock support comprises an opening configured to allow the main bearing to pass through the rotor lock support in the second configuration of the base.

15. A crane system for handling components of a wind turbine comprising a base according to claim 1 and a portable crane.

16. The crane system according to claim 15 mounted in a nacelle of a wind turbine, wherein, when in the first configuration, the base is supported by a main bearing of the wind turbine, and wherein, when in the second configuration, the base is supported by a bed plate of a nacelle of the wind turbine.

17. The base according to claim 1, wherein the base further comprises two side structures configured for being supported by the bed plate of the nacelle in the second configuration of the base and for supporting the portable crane in the second configuration of the base.

18. The base according to claim 17, wherein the two side structures are configured for being directly connected to the bed plate of the nacelle in the second configuration of the base.

19. A method for removing a main bearing of a wind turbine comprising the steps of:
providing a base mountable on the wind turbine, wherein the base is configured to be switched between a first configuration and a second configuration, wherein in the first configuration the base is configured for being supported by a main bearing of the wind turbine, wherein in the second configuration the base is configured for being supported by a bed plate of a nacelle of the wind turbine, and wherein the base is configured for supporting a portable crane while switching between the first configuration and the second configuration,
providing a portable crane mountable on the base,
mounting the base to the nacelle of the wind turbine,
mounting the portable crane to the base,
if the base is in the first configuration, switching the base from the first configuration to the second configuration, and
lifting the main bearing using the portable crane.

20. The method according to claim 19 further comprising the steps of:
switching the base from the second configuration to the first configuration, and
lifting the gear box using the portable crane.

* * * * *